US005626661A

United States Patent [19]
Schmid et al.

[11] Patent Number: 5,626,661
[45] Date of Patent: *May 6, 1997

[54] LUSTER PIGMENTS BASED ON MULTIPLY COATED PLATELETLIKE SILICATIC SUBSTRATES

[75] Inventors: Raimund Schmid, Neustadt; Norbert Mronga, Dossenheim; Harald Ochmann, Dannstadt-Schauernheim; Joerg Adel, Ludwigshafen, all of Germany

[73] Assignee: BASF Aktiengesellschaft, Ludwigshafen, Germany

[*] Notice: The portion of the term of this patent subsequent to Nov. 15, 2011, has been disclaimed.

[21] Appl. No.: 244,711

[22] PCT Filed: Dec. 3, 1992

[86] PCT No.: PCT/EP92/02793

§ 371 Date: Jun. 13, 1994

§ 102(e) Date: Jun. 13, 1994

[87] PCT Pub. No.: WO93/12182

PCT Pub. Date: Jun. 24, 1993

[30] Foreign Application Priority Data

Dec. 13, 1991 [DE] Germany ............... 41 41 069.6

[51] Int. Cl.$^6$ ................................ C04B 14/20
[52] U.S. Cl. ............ 406/415; 106/417; 106/439; 106/459; 106/472; 106/474; 106/479; 106/31.9
[58] Field of Search ................... 106/417, 439, 106/459, 472, 474, 479, 20 R

[56] References Cited

U.S. PATENT DOCUMENTS

| | | | |
|---|---|---|---|
| 3,053,683 | 9/1962 | Yolles | 427/220 |
| 3,087,827 | 4/1963 | Klenke et al. | 106/417 |
| 3,107,173 | 10/1963 | Klenke, Jr. | 106/417 |
| 4,076,551 | 2/1978 | Bernhard et al. | 106/417 |
| 4,552,593 | 11/1985 | Ostertag | 106/417 |
| 4,867,793 | 9/1989 | Franz et al. | 106/415 |
| 5,017,638 | 5/1991 | Handa et al. | 524/449 |
| 5,277,711 | 1/1994 | Schmidt et al. | 106/404 |
| 5,364,467 | 11/1994 | Schmid et al. | 106/404 |

FOREIGN PATENT DOCUMENTS 38 25 702.5  2/1990  Germany.

OTHER PUBLICATIONS

Derwent abstract 90-037778/06 of DE 3825702-A, Hild et al., "Novel goniochromatic pigment – used in security and effect inks", Feb. 1990.

*Primary Examiner*—Mark L. Bell
*Assistant Examiner*—Scott L. Hertzog
*Attorney, Agent, or Firm*—Oblon, Spivak, McClelland, Maier & Neustadt, P.C.

[57] ABSTRACT

Luster pigments based on multiply coated plateletlike silicatic substrates, obtainable by further coating substrates already coated with a first layer comprising a colorless or selectively absorbing metal oxide a) initially with a second, nonselectively absorbing layer consisting essentially of carbon, a metal or a metal oxide, and b) if desired subsequently with a third layer comprising colorless or selectively absorbing metal oxide, wherefor the carbon layer (step a) is applied by thermal decomposition of oxygen-containing hydrocarbons that for every two carbon atoms contain at least one oxygen atom, the metal layer (step a) is applied by gas phase decomposition of volatile compounds of these metals in an inert gas, and the metal oxide layer (step a and/or b) is applied by gas phase decomposition of volatile compounds of these metals in the presence of oxygen, water vapor or mixtures thereof to the substrates coated in case a) with a first metal oxide layer and in case b) additionally with a nonselectively absorbing layer a), and also specific pigments and preparation and use of the luster pigments for coloring paints, printing inks, plastics, decorative cosmetic preparations, glasses and ceramic products.

14 Claims, No Drawings

LUSTER PIGMENTS BASED ON MULTIPLY COATED PLATELETLIKE SILICATIC SUBSTRATES

The present invention relates to novel luster pigments based on multiply coated plateletlike silicatic substrates, obtainable by further coating substrates already coated with a first layer comprising a colorless or selectively absorbing metal oxide
a) initially with a second, nonselectively absorbing layer consisting essentially of carbon, a metal or a metal oxide, and
b) if desired subsequently with a third layer comprising colorless or selectively absorbing metal oxide, wherefor the carbon layer (step a) is applied by thermal decomposition of oxygen-containing hydrocarbons that for every two carbon atoms contain at least one oxygen atom, the metal layer (step a) is applied by gas phase decomposition of volatile compounds of these metals in an inert gas, and the metal oxide layer (step a and/or b) is applied by gas phase decomposition of volatile compounds of these metals in the presence of oxygen, water vapor or mixtures thereof
to the substrates coated in case a) with a first metal oxide layer and in case b) additionally with a nonselectively absorbing layer a).

The invention further relates to novel luster pigments based on multiply coated plateletlike silicatic substrates comprising
A) a first layer comprising a colorless or selectively absorbing metal oxide,
B) a second, nonselectively absorbing layer consisting essentially of carbon or a metal, and
C) a third layer comprising a colorless or selectively absorbing metal oxide
and those comprising
A) a first layer comprising a colorless or selectively absorbing metal oxide and
B) a second, nonselectively absorbing layer consisting essentially of metallic iron, molybdenum and/or tungsten.

The invention also relates to the preparation of these luster pigments and to the use thereof for coloring paints, printing inks, plastics, decorative cosmetic preparations, glasses and ceramic products.

Luster or effect pigments are increasingly used in many sectors of industry, for example in automobile coatings, decorative coatings, plastics pigmentation, printing inks, in particular encaustic inks, paints and cosmetics.

Their optical effect is based on directional reflection at predominantly sheetlike, oriented metallic or strongly refractive pigment particles. According to the nature of the pigment particles, the pigments are also known as metallic effect pigments (eg. aluminum, zinc, copper or alloys thereof) or pearl luster pigments (eg. based on coated mica such as muscovite, phlogopite and biotite, talc or glass).

Luster pigments may have a multiphase structure, formed by coating the starting substrates with thin films of highly refractive oxides such as chromium(III) oxide, in particular iron oxide and titanium oxide. Interference with or without absorption will in these cases result in a multiplicity of hue variations depending on the thickness of the oxide layer; these pigments are therefore also known as interference pigments.

As a result of the incident light being reflected directionally at the plateletlike pigment particles, coated luster pigments that are oriented, for example in a lacquer, exhibit goniochromaticity; that is, their perceived color (lightness and/or hue and/or chroma) varies with the angle of illumination or observation. These effects can be ascribed to a complex interplay of reflection and transmission of the incident light, the color of which can be altered by phenomena due to the pigment particles, such as interference in thin films and absorption by colored centers.

It is known to coat already oxide-coated plateletlike silicatic substrates with further layers to obtain specific properties.

For instance, EP-A-313 280 discloses the further coating with wet-chemically electrolessly deposited metals, including cobalt. In DE-A-3 825 702 the further coating with metals, inter alia chromium and nickel, is effected by wet-chemical reduction from a metal salt solution or by vacuum deposition. According to U.S. Pat. No. 3,053,683 uncoated glass particles can be coated with nickel, chromium or molybdenum by gas phase decomposition of nickel tetracarbonyl, dibenzenechromium or dibenzenemolybdenum.

DE-A-1 165 182 describes the coating of oxide-coated mica platelets with carbon by pyrolysis of hydrocarbons or higher fatty acids or derivatives thereof which, to avoid the formation of free soot particles, should contain oxygen in not more than minor amounts.

Finally, DE-A-3 617 430 discloses providing oxide-coated mica platelets with a further layer containing iron(II) oxide, which can be wuestite, magnetite or further mixed oxides. These layers were obtained either wet-chemically by oxidation of an iron(II) salt solution and subsequent drying or by reduction of an iron(III) oxide layer already additionally applied to the mica particles. In addition, these pigments can additionally be coated with a cover layer of colorless oxides.

However, the known multiply coated mica particles are unsatisfactory in various respects. The main problem is that the applied layers are not homogeneous. On the contrary, especially the wet-chemical deposition of metals or metal oxides results on the platelet surface in island-like layer fragments which do not give uniform coverage. Pigments so coated are neither suitable for further coating, for example with a colored metal oxide to obtain special color effects, nor, despite the applied metal or magnetite layer, of enhanced conductivity compared with the only oxide-coated mica platelets.

It is an object of the present invention to provide novel luster pigments which are free of the abovementioned disadvantages and hence advantageously usable for the desired purposes.

We have found that this object is achieved by the luster pigments defined at the beginning.

We have also found the thereby defined process for preparing these pigments.

We have also found the use of these pigments for coloring paints, printing inks, plastics, decorative cosmetic preparations and ceramic products.

Suitable plateletlike silicatic substrates for the multiply coated luster pigments of the invention are in particular light-colored or white mica, particularly preferably flakes of preferably wet-ground muscovite. It is of course also possible to use other natural micas, such as phlogopite or biotite, artificial micas or talc or glass flakes.

The substrate particles used have already been coated with a first layer comprising a colorless or selectively absorbing (ie. non-black) metal oxide of high refractive index, for example titanium oxide, zirconium oxide, tin oxide, chromium oxide, iron oxide, aluminum oxide, silicon oxide, tin oxide, bismuth oxychloride or mixtures thereof.

Preference is given to coatings with iron(III) oxide or zirconium dioxide and particularly preferably with titanium dioxide.

These singly coated pigments are generally known; cf. for example DE-C-1 467 468, EP-A-45 851, DE-A-3 237 264 and DE-A-3 617 430. Metal oxide-coated mica platelets are also commercially available under the names Iriodin® (E. Merck, Darmstadt), Flonac® (Kemira Oy, Pori, Finland) or Mearlin® (Mearl Corporation, New York).

Of course, it is also possible to use uncoated substrates and to coat them with a first metal oxide layer using the gas phase decomposition of appropriate metal compounds according to the invention.

The size of the substrate particles is not critical per se and can be adapted to the particular intended use. In general, the particles have largest diameters from about 1 to 200 μm, in particular from about 5 to 100 μm, and thicknesses from about 0.1 to 5 μm, in particular about 0.5 μm.

In the luster pigments of the invention, the substrates coated with a first layer comprising a colorless or selectively absorbing metal oxide of high refractive index have been coated with a second, nonselectively absorbing layer. This layer consists of carbon, metals, in particular those which can be applied by gas phase decomposition of volatile compounds, such as iron, cobalt, nickel, chromium, molybdenum or tungsten, or black metal oxides such as magnetite, nickel oxide, cobalt oxides (COO, $Co_3O_4$) and vanadium oxides ($VO_2$, $V_2O_3$) and mixtures thereof, in particular iron and magnetite.

This second coating can be carried out with advantage by the below-described method of the invention by thermal decomposition of suitable starting compounds.

The black layers thus obtainable are notable for a uniform, homogeneous, film-like constitution. They are semitransparent to light, ie. they reduce the white content of the incident and reflected light and thus bring about an enhancement of the interference color of the substrate and, if of appropriate thickness, will also continue the interference chain of the substrate.

Furthermore, the doubly coated luster pigments of the invention show in their applied state, for example in a paint, print or plastic, an interesting color flop. Depending on the angle of illumination or observation, the color seen is due to the interference of the first oxide layer or due to absorption of the second layer and, depending on the particular material, ranges from black to gray and can be controlled not only via the thickness but also via the composition of the layer.

Moreover, the doubly coated pigments of the invention show, in the application state, high luster and high hiding power. The hiding power can be controlled via the thickness of the second layer in that the thicker the black layers, the higher hiding the pigments will be, of course. However, overly thick layers can also hide the interference effect. In general, the layer thicknesses range from 0.1 to 100 nm, preferably from 0.2 to 20 nm. The optimal layer thickness will in general be adapted to the particular application.

If the black layers of the invention consist of metal or magnetite, the pigments of the invention show not only the interesting color effects but also electrical conductivity, which at from about $10^{-4}$ to 1 S/cm is significantly higher than that of the mica particles coated with titanium dioxide only, which have conductivities of the order from $10^{-8}$ to $10^{-10}$ S/cm. The conductivity too is dependent on the layer thickness, which should advantageously be within the range from about 2 to 100 nm and should likewise be adapted on a case-by-case basis.

Furthermore, it can be of advantage for the doubly coated luster pigments to be coated additionally with a top coat comprising a colorless or selectively absorbing metal oxide. In this case the black interlayers are preferably thin layers from about 2 to 30 nm in thickness. This third layer according to the invention can have the function of protecting the black layer in certain applications. It also results in pigments having particularly high hiding power. If colored oxides are used in the top layer, the color flop will be from the respective interference color to the intrinsic color of the oxide, in the case of iron(III) oxide for example to reddish brown. In general, the thin oxide layers contribute to the interference of the pigment, continuing the interference chain in the area determined by the starting material. Triple coating thus advantageously widens the color palette of the luster pigments.

The third layers according to the invention can be composed of the usual highly refractive, colorless and colored but not black metal oxides suitable for coating interference pigments. Examples are titanium oxide, zirconium oxide, tin oxide, chromium oxide, iron oxide, aluminum oxide, silicon oxide and zinc oxide and mixtures thereof. Particular preference is given to iron(III) oxide, titanium dioxide, zirconium dioxide and mixtures thereof. Specifically, the third layer of oxide is advantageously adapted to the second, black layer.

The thickness of the third layer is not critical per se and generally will be from about 1 to 400 nm, in particular from 5 to 200 nm.

This third coating can likewise be advantageously applied by the method of the invention by gas phase decomposition of suitable metal compounds.

In the novel process for preparing the multiply coated plateletlike silicatic substrates, the individual coatings are each effected by thermal decomposition of suitable starting compounds in the presence of the substrate particles to be coated.

The metal oxide-coated substrates are coated with carbon using oxygen-containing hydrocarbons that contain at least one oxygen atom for every two carbon atoms, such as polyvinyl alcohol, but in particular sorbitol and especially compounds of the molecular formula $(CH_2O)_n$, where n is generally from 1 to 6, especially 5 or 6, for one monomer unit. These compounds are preferably low molecular weight sugars such as glucose and dextrose, but it is also possible to use high molecular weight sugars such as starch and polymeric compounds such as polyoxymethylene.

It is advantageous to apply these compounds, in particular sugars, to the substrate surface initially in a finely divided state. For this it is particularly advantageous to prepare a thick aqueous paste from the substrate and the sugar. However, it is also possible to stir the substrate into an aqueous sugar solution and then to filter off the substrate particles thus coated with an aqueous sugar film. Furthermore, the substrate and the particularly finely ground sugar can also be mixed dry. In general, the amount of sugar used is from 0.1 to 20% by weight, preferably from 1 to 10% by weight, based on the amount of substrate.

The thermal decomposition of the sugar layer, advantageously predried, for example in a drying cabinet or in a spray dryer, to form carbon can then be carried out in a rotary sphere furnace, in which case, depending on the starting compounds, temperatures of in general from 100° to 700° C., in particular from 200° to 550° C., are required. The thermal decomposition is preferably carried out under a protective gas such as nitrogen. The resulting water evaporates, and the carbon remains behind on the substrate as a homogeneous, optically semitransparent film. Of particular advantage when coating with carbon according to the invention are the low reaction temperatures below 500° C., which prevent damage to the substrate material.

The further layers, not only the second layer consisting of a metal or a black metal oxide but also the third, metal oxide layer, are applied in the process of the invention by gas phase decomposition of volatile compounds of the metals in the presence of agitated substrate particles. This coating can advantageously be carried out in a heatable fluidized-bed reactor as described for example in EP-A-45 851, in which initially the substrate particles are fluidized by a gas and heated to the decomposition temperature of the respective metal compound, in general to 70°–350° C. The vaporized metal compounds and the gases which may be required for achieving decomposition are then introduced via separate nozzles.

To deposit the metallic layers it is preferable to use the corresponding metal carbonyls, in particular iron pentacarbonyl but also chromium hexacarbonyl, molybdenum hexacarbonyl and tungsten hexacarbonyl, as well as nickel tetracarbonyl and dimeric cobalt tetracarbonyl, which are thermally decomposed to the respective metals in a protective gas such as nitrogen or argon as also used for fluidizing the substrate.

If the second, black layers are to consist of lower metal oxides, such as magnetite, $VO_2$ or $V_2O_3$, it is advantageous to hydrolyze the metal carbonyls, such as iron pentacarbonyl, or oxychlorides, such as vanadium oxychloride, with water vapor. To add the water vapor at a controlled rate, an inert carrier gas, in particular nitrogen, that is also being used for fluidizing the substrate is loaded with water vapor. If this gas phase decomposition initially deposits higher metal oxides, eg. $V_2O_5$, they must be subsequently reduced, for example with hydrogen or ammonia, to the desired oxide.

To deposit the third layer of metal oxide and also the second layer, consisting for example of nickel oxide or cobalt oxide, use is made of volatile metal compounds, preferably the carbonyls, halides, in particular chlorides, and alkoxides, not only aromatic alkoxides such as phenoxides and benzyl alkoxides but also aliphatic alkoxides, in particular $C_1$–$C_4$-alkoxides such as n-, iso- and tert-butoxides, preferably methoxides and ethoxides and particularly preferably n- and iso-propoxides. The carbonyls are here advantageously oxidized by oxygen in a mixture with nitrogen (eg. air), whereas the halides and alkoxides are hydrolyzed by water vapor, although in the case of the halides oxygen (or air) may be present, too. The oxygen or water vapor must be supplied in an amount which is at least that required stoichiometrically for forming the desired oxide or, in the case of the carbonyls, carbon dioxide, but it is also possible to use a small excess. The fluidizing gas used in this coating operation can be not only nitrogen but also air.

Preferred metal compounds are iron pentacarbonyl, chromium hexacarbonyl, aluminum chloride, silicon tetrachloride, tin tetrachloride, titanium tetrachloride, zirconium tetrachloride, vanadium oxychloride, titanium n-propoxide, titanium isopropoxide, zirconiumn-propoxide and zirconium isopropoxide. Which metal compound is best used depends on the nature of the second layer already applied. If this layer is for example a metal layer, then it is preferable to use carbonyls or alkoxides.

All the coating operations are advantageously carried out by vaporizing the metal compounds in a vaporizer upstream of the reactor and transporting the resulting vapors into the reactor by means of a carrier gas, generally air or nitrogen, depending on the reaction conditions required.

To obtain homogeneous layers that enrobe the substrate uniformly and completely, the gas quantity of the metal compound should be generally not more than 5% by volume, preferably not more than 2% by volume, of the total quantity of gas in the reactor.

After each coating operation the reactor is cooled down. If the applied layer is a metal or a lower metal oxide, the fluidizing gas is preferably admixed with air in the cooling phase in order that the layer surface may be passivated by oxidation. The cold product is then discharged.

In the preparation of the triply coated luster pigments of the invention it is not necessary to isolate the substrate which has been coated with a second layer comprising a metal or black metal oxide; on the contrary, the third coating operation can advantageously be carried out in the same reactor vessel immediately following the second coating operation, if desired after a small reduction in the temperature of the reactor contents and passivation.

The process of the invention makes it possible to prepare multiply coated luster pigments in a simple manner. The thickness of the layers produced can be set specifically and reproducibly to the desired value via the coating time, the concentration of metal compound used and the ratio of initially charged pigment particles to added metal compound. The luster pigments obtained in this way are notable for the high quality of the coating, ie. for homogeneous, uniform layers enrobing the substrate particles in film fashion, as is evident in the conductivity of the pigments doubly coated with an outer metal or magnetite layer and in the cleanness of hue and color strength not only of the doubly but also of the triply coated pigments.

The luster pigments of the invention are advantageous for many purposes, such as the coloring of paints, printing inks, plastics, decorative cosmetic preparations, glasses and ceramic products. Their special properties make them suitable for other special applications. The metal-coated pigments can for example be used in electrically conductive or electromagnetically screening plastics, paints and coatings or in conductive polymers without having to dispense with attractive colors. The pronounced light/dark flop of the applied black-coated pigments and the color flop of the pigments triply coated with colored oxide make it possible to manufacture encaustic and effect inks, in particular for securities printing and for preparing forgeryproof documents. The excellent hiding power of the triply coated pigments in particular frequently makes it possible to dispense with the otherwise necessary base coating, which is of particular interest for example in automotive coating.

EXAMPLES

Preparation of luster pigments according to the invention

The exemplified coatings of mica pigments already coated with a first layer of metal oxide were each carried out in an externally heatable fluidized-bed reactor made of glass, having a diameter of 8 cm and a height of 80 cm, and equipped with a glass frit bottom and filter socks, suspended from the top and to be cleaned with a nitrogen jet, and two gas injection nozzles situated on the side above the frit bottom.

A) Preparation of doubly coated luster pigments

EXAMPLES 1 TO 9

200 g of the metal oxide-coated mica pigment specified in each case in the Table below were heated to 200° C. in the fluidized-bed reactor under fluidization with a nitrogen stream at a total rate of from 600 to 800 l/h, a portion y l/h of the nitrogen passing through a glass reservoir heated to the vaporization temperature V [°C.] to introduce x g of metal carbonyl into the reactor.

On completion of metal deposition and cooling to room temperature, the fluidizing gases were slowly admixed with air to passivate the surface of the metal layer. Then the coated pigment was discharged.

To determine the electrical conductivity, in each case about 0.5 g of pigment was compressed under 500 bar to about 0.1 cm thickness and 0.2 cm diameter. The resistance of the specimens was measured with the resistance meters M 2031 BBC Goerz Metrawatt (suitable for good conductors) and Teraohm-Meter (from Knick; suitable for insulators) and converted in known manner to the specific electrical conductivity.

Details of these experiments and their results are summarized in the following Table:

EXAMPLE 12

200 g of the mica pigment Iriodin 9215 rutils pearl red WR were heated to 200° C. in the fluidized-bed reactor under fluidization with a nitrogen stream of in total 800 l/h. Then 53 g of iron pentacarbonyl vaporized at room temperature were introduced with half of the fluidizing gas in the course of 4 h. A sample taken after the deposition of iron had ended had a deep red color and an iron content of 6.9% by weight.

After cooling to 100° C. the fluidizing gas was admixed with a little air to passivate the metal surface.

For the subsequent coating operation the temperature was raised back up to 180° C. The 400 l/h nitrogen stream (fluidizing gas) used to introduce 375 g of iron pentacarbonyl was additionally admixed with 200 l/h of air. As the thickness of the iron oxide layer deposited on the pigment

| Ex. | Metal oxide-coated mica pigment | x g of Metal carbonyl | V [°C.] | y l of $N_2$/h | Metal content [% wt.] | Hue | Specific electrical conductivity [S/cm] |
|---|---|---|---|---|---|---|---|
| 1 | Iriodin® 9225 rutile pearl blue WR (Merck) | 40.8 Mo(CO)$_6$ | 70 | 300 | Mo: 6.4 | dark blue/ metallic | 0.20 |
| 2 | Iriodin 9103 sterling silver WR | 40.8 Mo(CO)$_6$ | 70 | 300 | Mo: 14.7 | silver | 0.01 |
| 3 | Iriodin 9219 rutile pearl lilac WR | 40.8 Mo(CO)$_6$ | 70 | 300 | Mo: 4.1 | violet | $1.3 \times 10^{-3}$ |
| 4 | Iriodin 9235 rutile pearl green WR | 40.8 Mo(CO)$_6$ | 70 | 300 | Mo: 6.4 | yellowish green | 0.04 |
| 5 | Iriodin 9215 rutile pearl red WR | 40.8 Mo(CO)$_6$ | 70 | 300 | Mo: 5.4 | bluish red | 0.10 |
| 6 | Iriodin 9205 rutile brilliant yellow WR | 40.8 Mo(CO)$_6$ | 70 | 300 | Mo: 5.0 | gold | 0.10 |
| 7 | Iriodin 9217 rutile pearl copper WR | 40.8 Mo(CO)$_6$ | 70 | 300 | Mo: 5.2 | deep red | $6.3 \times 10^{-3}$ |
| 8 | Iriodin 9225 rutile pearl blue WR | 40.0 Cr(CO)$_6$ | 85 | 400 | Cr: 3.7 | greenish blue | $6.1 \times 10^{-3}$ |
| 9* | Iriodin 9103 sterling silver WR | 188.9 Fe(CO)$_5$ | 25 | 400 | Fe: 19.6 | silver | 0.36 |

*Reaction temperature 200–220° C.

EXAMPLE 10

50 g Of the mica pigment Iriodin 9225 rutils pearl blue were introduced with stirring into a solution of 4 g of sorbitol in 50 ml of water. The resulting mass was dried at 100° C. for 10 h, subsequently coarsely comminuted and then heated over 1 h in a rotary sphere oven in a nitrogen atmosphere to 450° C. and held at that temperature for 3 h. This was followed by cooling, again under nitrogen.

The pigment obtained had a carbon content of 1.1% by weight and a deep blue color.

EXAMPLE 11

200 g of the mica pigment Iriodin 9225 rutils pearl blue were heated to 180° C. in the fluidized-bed reactor under fluidization with a nitrogen stream of is total 800 l/h. In the subsequent coating, half of the fluidizing gas was passed through a 50° C. water reservoir. To prepare the coating 72.7 g of iron pentacarbonyl vaporized at room temperature were passed into the reactor in a nitrogen stream of 400 l/h.

After the coating had ended, the pigment was cooled down to room temperature.

The magnetite-coated pigment obtained had an iron content of 7.5% by weight, a greenish blue hue and a specific electrical conductivity of $7.3 \times 10^{-3}$ S/cm.

B) Preparation of triply coated luster pigments particles increased, the hue changed from red to bluish red, blue, green, yellow, golden yellow, yellowish red back to red.

The triply coated pigment obtained had a total iron content of 26% by weight and a red hue and, applied in a paint, showed a marked light/dark flop.

COMPARATIVE EXAMPLE

Example 12 was repeated with iron oxide only.

Incorporating the resulting red pigment and each of the samples taken in the course of the coating operation in paint produced compared with the samples of Example 12 consistently poorer hiding power and less pronounced light/dark flop.

EXAMPLE 13

Example 12 was repeated by coating 200 g of the mica pigment Iriodin 9225 futile pearl blue WR initially with an iron layer by decomposition of 50 g of iron pentacarbonyl and then additionally with an iron oxide layer by oxidation of 276 g of iron pentacarbonyl.

The pigment obtained had a total iron content of 24.8% by weight and a deep red color.

EXAMPLE 14

200 g of the mica pigment Mearl® Brilliant Gold (from Mearl) was initially coated as described in Example 1 with metallic molybdenum by decomposition of 20.5 g of molybdenum hexacarbonyl, the pigment obtained having a golden yellow color. The reactor temperature was then lowered to 180° C. Then 175 g of iron pentacarbonyl vaporized at room temperature were added in a nitrogen stream of 250 l/h.

Conventional further treatment produced a high hiding effect pigment having a green interference color and a molybdenum content of 2.4% by weight and an iron content of 14.8% by weight.

EXAMPLE 15

200 g of the mica pigment Iriodin 9205 rutile Brilliant Yellow WR were stirred in a 10% strength by weight aqueous solution of sorbitol for 2 h, filtered off and dried at 100° C. for 10 h. The caked-together product was then heated under nitrogen over 2 h in a rotary sphere oven to 450° C. and held at that temperature for 3 h. After cooling down under nitrogen, the pigment obtained, which had a homogeneous coating of carbon, showed a deeper yellow color.

The carbon black-coated pigment was then heated to 180° C. in the fluidized-bed reactor under fluidization with a nitrogen stream of in total 800 l/h. At the start of the addition in a nitrogen stream of 400 l/h of 131 g of iron pentacarbonyl vaporized at room temperature, the fluidizing gas was admixed with 200 l/h of air to deposit iron oxide.

Conventional further treatment produced a bluish green pigment having a carbon content of 0.8% by weight and an iron content of 13.6% by weight.

We claim:

1. Luster pigments of multiply coated platelet-shaped silicatic substrates, obtained by coating silicate substrates, already coated with a first layer comprising a colorless or selectively absorbing metal oxide, with a second, nonselectively absorbing layer consisting essentially of a metal or a metal oxide,
   wherein the metal layer is applied by gas phase decomposition of a volatile compound of a metal in an inert gas, or
   wherein the metal oxide layer is applied by gas phase decomposition of a volatile compound of a metal in the presence of oxygen, water vapor or mixtures thereof, to said substrates coated with a first metal oxide layer.

2. Luster pigments as claimed in claim 1, wherein the first layer comprises titanium oxide, zirconium oxide, tin oxide, iron oxide, or combinations thereof.

3. A method of coloring a material selected from the group consisting of paints, printing inks, plastics, decorative cosmetic preparations, glasses and ceramic products, which comprises:
   incorporating the luster pigment of claim 2 in the preparative formulation of said material.

4. Luster pigments as claimed in claim 1, wherein the second, nonselectively absorbing layer consists essentially of, iron, cobalt, nickel, chromium, molybdenum, tungsten, magnetite, nickel oxide, cobalt oxide, vanadium oxide, or combinations thereof.

5. A method of coloring a material selected from the group consisting of paints, printing inks, plastics, decorative cosmetic preparations, glasses and ceramic products, which comprises:
   incorporating the luster pigment of claim 4 in the preparative formulation of said material.

6. Luster pigments of multiply coated platelet-shaped silicatic substrates, comprising:
   A) a silicate substrate having a first layer comprising a colorless or selectively absorbing metal oxide thereon, and
   B) a second, nonselectively absorbing layer consisting essentially of metallic iron, molybdenum and/or tungsten therein.

7. Luster pigments of multiply coated platelet-shaped silicatic substrates, obtained by coating substrates, already coated with a first layer comprising a colorless or selectively absorbing metal oxide,
   a) initially with a second, nonselectively absorbing layer consisting essentially of carbon, a metal or a metal oxide, and
   b) subsequently with a third layer comprising colorless or selectively absorbing metal oxide,
   wherein
   i) the carbon layer (step a) is applied by thermal decomposition of an oxygen-containing hydrocarbon which for every two carbon atoms contains at least one oxygen atom,
   ii) the metal layer (step a) is applied by gas phase decomposition of a volatile compound of a metal in an inert gas, and
   iii) the metal oxide layer (step a and/or b) is applied by gas phase decomposition of a volatile compound of a metal in the presence of oxygen, water vapor or mixtures thereof, to said substrates coated with said second nonselectively absorbing layer a).

8. Luster pigments as claimed in claim 7, wherein the first layer comprises titanium oxide, zirconium oxide, tin oxide, iron oxide, or combinations thereof.

9. Luster pigments as claimed in claim 7, wherein the second, nonselectively absorbing layer consists essentially of carbon, iron, cobalt, nickel, chromium, molybdenum, tungsten, magnetite, nickel oxide, cobalt oxide, vanadium oxide, or combinations thereof.

10. Luster pigments as claimed in claim 7, wherein the third layer comprises titanium oxide, zirconium oxide, chromium oxide, iron oxide, or combinations thereof.

11. A process for preparing luster pigments of multiply coated platelet-shaped silicatic substrates, comprising:
    a) coating substrates, already coated with a first layer comprising a colorless or selectively absorbing metal oxide, with a second, nonselectively absorbing layer consisting essentially of carbon, a metal, or a metal oxide; and
    b) subsequently coating said carbon, metal, or metal oxide coated substrate with a third layer comprising colorless or selectively absorbing metal oxide said coating in step b) being optional for said metal or metal oxide coated substrate;
    wherein
    i) the carbon layer (step a) is applied by thermal decomposition of an oxygen-containing hydrocarbon which for every two carbon atoms contains at least on oxygen atom,
    ii) the metal layer (step a) is applied by gas phase decomposition of a volatile compound of a metal in an inert gas, and
    iii) the metal oxide layer (step a and/or b) is applied by gas phase decomposition of a volatile compound of a metal in the presence of oxygen, water vapor, or mixtures thereof, to the substrates coated in case a) with a first metal oxide layer and in case b) additionally with a nonselectively absorbing layer a).

12. The process of claim 11, wherein the volatile metal compound in step (a) is a metal carbonyl and wherein in step (b) the metal as a metal carbonyl, metal halide, metal oxychloride, or metal alkoxide is decomposed in the presence of oxygen, water vapor, or mixtures thereof.

13. A process for preparing luster pigments of multiply coated platelet-shaped silicatic substrates, comprising:

coating a silicate substrate, already coated with a first layer comprising a colorless or selectively absorbing metal oxide, with a second, nonselectively absorbing layer consisting essentially of a metal or a metal oxide, wherein the metal layer is applied by gas phase decomposition of a volatile compound of a metal in an inert gas, and wherein the metal oxide layer is applied by gas phase decomposition of a volatile metal carbonyl compound in the presence of oxygen, water vapor, or mixtures thereof, to the substrates coated with a first metal oxide layer.

14. Luster pigments of multiply coated platelet-shaped silicatic substrates, comprising:

A) a silicate substrate having a first layer comprising a colorless or selectively absorbing metal oxide thereon, B) a second, nonselectively absorbing layer consisting essentially of carbon, metallic iron, molybdenum and/or tungsten, and C) a third layer comprising a colorless or selectively absorbing metal oxide.

* * * * *